US010029575B2

(12) United States Patent
Remisch

(10) Patent No.: US 10,029,575 B2
(45) Date of Patent: Jul. 24, 2018

(54) ELECTRIC LINE ARRANGEMENT

(71) Applicant: Dr. Ing. h.c. F. Porsche Aktiengesellschaft, Stuttgart (DE)

(72) Inventor: Dirk Remisch, Mönsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/355,722

(22) Filed: Nov. 18, 2016

(65) Prior Publication Data

US 2017/0144558 A1    May 25, 2017

(30) Foreign Application Priority Data

Nov. 19, 2015    (DE) .................. 10 2015 120 048

(51) Int. Cl.
| | |
|---|---|
| B60L 11/18 | (2006.01) |
| H01B 9/02 | (2006.01) |
| H01R 13/00 | (2006.01) |
| H01B 9/00 | (2006.01) |
| H01B 7/42 | (2006.01) |

(52) U.S. Cl.
CPC ....... *B60L 11/1818* (2013.01); *B60L 11/1816* (2013.01); *H01B 9/02* (2013.01); *H01R 13/005* (2013.01); *B60L 2230/12* (2013.01); *B60L 2240/36* (2013.01); *H01B 7/425* (2013.01); *H01B 9/006* (2013.01); *Y02T 10/7005* (2013.01); *Y02T 10/7088* (2013.01); *Y02T 90/121* (2013.01); *Y02T 90/14* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 1,866,611 A | * | 7/1932 | Affel ................. | H01B 11/1882 174/14 R |
| 3,736,364 A | * | 5/1973 | Kubo .................. | H01B 7/423 165/104.25 |
| 4,310,718 A | | 1/1982 | Eng | |
| 6,100,467 A | | 8/2000 | Kroulik | |
| 2015/0217654 A1 | * | 8/2015 | Woo ................... | B60L 11/1818 320/109 |

FOREIGN PATENT DOCUMENTS

| | | | |
|---|---|---|---|
| DE | 2951432 | 7/1980 | |
| DE | 2951432 A1 | * 7/1980 | ............. H01B 7/425 |
| DE | 19921310 | 11/2000 | |
| WO | 9211647 | 7/1992 | |

OTHER PUBLICATIONS

German Search Report with partial English language translation for 102015120048.1, dated Nov. 19, 2015, 9 pages.

* cited by examiner

*Primary Examiner* — William H Mayo, III
*Assistant Examiner* — Krystal Robinson
(74) *Attorney, Agent, or Firm* — RatnerPrestia

(57) ABSTRACT

An electric line arrangement, in particular a charging cable for a motor vehicle, having at least one electrically conductive lead which can be placed in electrical contact at its ends in order to transmit electrical energy, an insulation layer which surrounds the lead circumferentially, and a coolant duct in which a cooling fluid for cooling the lead is conducted, wherein the insulation layer is spaced apart from the lead, and the coolant duct is formed between the insulation layer and the lead in such a way that the cooling fluid flows directly around the lead.

11 Claims, 3 Drawing Sheets

ID: 102015120048.1
ELECTRIC LINE ARRANGEMENT

CROSS-REFERENCE TO RELATED APPLICATIONS

This application claims priority to German Patent Application No. 102015120048.1, filed Nov. 19, 2015, the content of such application being incorporated by reference herein in its entirety.

FIELD OF THE INVENTION

The present invention relates to an electric line arrangement, in particular a charging cable for a motor vehicle, having at least one electrically conductive lead which can be placed in electrical contact at its ends in order to transmit electrical energy, an insulation layer which surrounds the lead circumferentially, and a coolant duct in which a cooling fluid for cooling the lead is or can be conducted. The present invention also relates to an electric charging cable for a motor vehicle, having a first plug-type connector and a second plug-type connector, in order to connect the electric charging cable electrically to a motor vehicle or to a charging station.

BACKGROUND OF THE INVENTION

In the field of the electrical transmission of energy and, in particular, in the field of charging lines for motor vehicles, electric conductors are usually arranged in a sheathed line in which, in addition to the individually insulated electric conductors, filling cores made of plastic are accommodated, in order to permit a correspondingly round outer geometry of the sheathed line. As a result of the multiple insulation of the electric conductors and as a result of the filling cores within the sheathed line, the discharging of waste heat which is produced in the electric lines is low so that during the transmission of large electrical powers, in particular during the charging process of a motor vehicle, overheating of the electric leads and of the charging cable can generally occur.

In order to improve the cooling of an electric charging cable for motor vehicles it is known, for example from DE 199 21 310 A1, which is incorporated by reference, to form, in the electric line of the charging cable, a cooling duct through which a cooling medium can flow, in order to discharge waste heat of the electric leads.

It is disadvantageous here that the arrangement of the cooling duct in the electric leads is costly, and as a result of the additional insulation of the cooling duct and of the electric leads the transmission of heat between the electric leads and the cooling medium is low.

SUMMARY OF THE INVENTION

An object of the present invention is therefore to make available an improved electric line arrangement which permits improved cooling of electric leads with technically low expenditure.

This object is achieved in the case of the electric line arrangement mentioned at the beginning by virtue of the fact that the insulation layer is spaced apart from the lead, and the coolant duct is formed between the insulation layer and the lead in such a way that the cooling fluid flows directly around the lead.

This object is also achieved in the case of the electric charging cable for a motor vehicle as mentioned at the beginning by means of an electric line arrangement according to the present invention which is electrically connected to the plug-type connectors.

According to the present invention, the electrically conductive lead is not separately insulated so that the cooling fluid in the coolant duct can directly flow around the electric lead or electric conductors of the electric lead or can directly contact the current-conducting conductors of the electric lead, with the result that a direct transmission of heat from the electric lead to the cooling fluid is possible.

As a result of the fact that the cooling fluid directly flows around the electric lead, the transmission of heat between the cooling medium and the electric lead or the electrical conductors of the electric lead can be improved, since there is no need for the flow of heat to overcome an electrical insulation of the electric line, and a direct conventional transfer of heat between the electric conductor and the cooling fluid is ensured.

The electric line arrangement can consequently be made available with improved discharging of heat and with low technical expenditure, with the result that the object of the present invention is completely achieved.

In one preferred embodiment, a cavity, which forms the coolant duct, is formed between the insulation layer and the lead.

As a result of the fact that the coolant duct is formed merely by a cavity between the insulation layer and the electric lead and there is no need to make available a separate coolant duct, the technical expenditure on the coolant duct and, in particular, on the electric line arrangement can be reduced considerably.

In one preferred embodiment, the electric line arrangement also has a sheathed layer which surrounds the insulation layer circumferentially, wherein the sheathed layer is spaced apart from the insulation layer, and a second coolant duct is formed between the sheathed layer and the insulation layer.

As a result, the cooling fluid can be conducted in a closed system in the entire line arrangement, with the result that defined cooling of the electrically conductive leads is possible.

In one preferred embodiment, the first coolant duct forms a coolant forward flow line, and the second coolant duct forms a coolant return flow line.

As a result, the cooling fluid can be made available in a cooled state to the electrically conductive lead, and the cooling fluid can be fed back via the second coolant duct, with the result that a defined circulation of coolant can be achieved.

In a preferred embodiment, the electric line arrangement has a plug-type connector at at least one axial end in order to make electrical contact with the lead, and wherein the plug-type connector connects the first coolant duct to the second coolant duct.

As a result, the first coolant duct can be connected as a forward flow line to the second coolant duct as a coolant return flow line, with the result that a defined circulation of cooling fluid can be made available with low technical expenditure.

In one preferred embodiment, the electric line arrangement has a plug-type connector at at least one axial end, in order to make electrical contact with the lead, wherein the plug-type connector has an opening which is connected to the coolant duct in order to discharge the cooling fluid from the electric line arrangement.

As a result, a flow of cooling fluid can be generated in the coolant duct with low technical expenditure, and the cooling fluid can be discharged from the coolant duct with low technical expenditure.

In a preferred embodiment, the electric line arrangement has a plug-type connector at at least one axial end, in order to make electrical contact with the electrically conductive line, and wherein the plug-type connector can be connected to a coolant arrangement in order to feed the cooling fluid to the first coolant duct.

As a result, a cooled cooling fluid can be fed to the coolant duct through the coolant arrangement, as a result of which the cooling power of the electric line arrangement can be improved overall.

In one preferred embodiment, the cooling fluid is formed by ambient air which is introduced in a cooled or uncooled state into the coolant duct.

As a result, cooling fluid can be fed to the lines with low technical expenditure.

In one particular embodiment, the electric line arrangement has a pressure sensor which is arranged in the second coolant duct in order to detect a pressure drop in the coolant duct.

As a result, a leakage can be detected in the coolant duct with low technical expenditure, as a result of which a malfunction of the cooling system overall can be detected early.

In one preferred embodiment, a second pressure sensor is arranged in the first coolant duct in order to determine a position of damage to the coolant duct.

As a result, a leakage position in the coolant duct can be detected and determined with low technical expenditure, as a result of which the determination of the location of a leak and corresponding repair can be achieved with low technical expenditure.

Overall, improved cooling of the electric line can be made available by the present electric line arrangement with low technical expenditure, since the cooling fluid directly flows around the electric line, and the flow of heat is not impeded by insulation, wherein at the same time the technical expenditure is considerably reduced by the spacing apart of the insulation layer from the electric lead and by the cooling duct which is formed between them and forms a coolant line.

Of course, the features which are mentioned above and those which are still to be explained below can be used not only in the respectively specified combination but also in other combinations or alone without departing from the scope of the present invention.

BRIEF DESCRIPTION OF THE DRAWING FIGURES

Exemplary embodiments of the invention are illustrated in the drawing and will be explained in more detail in the following description, in which.

DETAILED DESCRIPTION OF THE INVENTION

Figure 1:
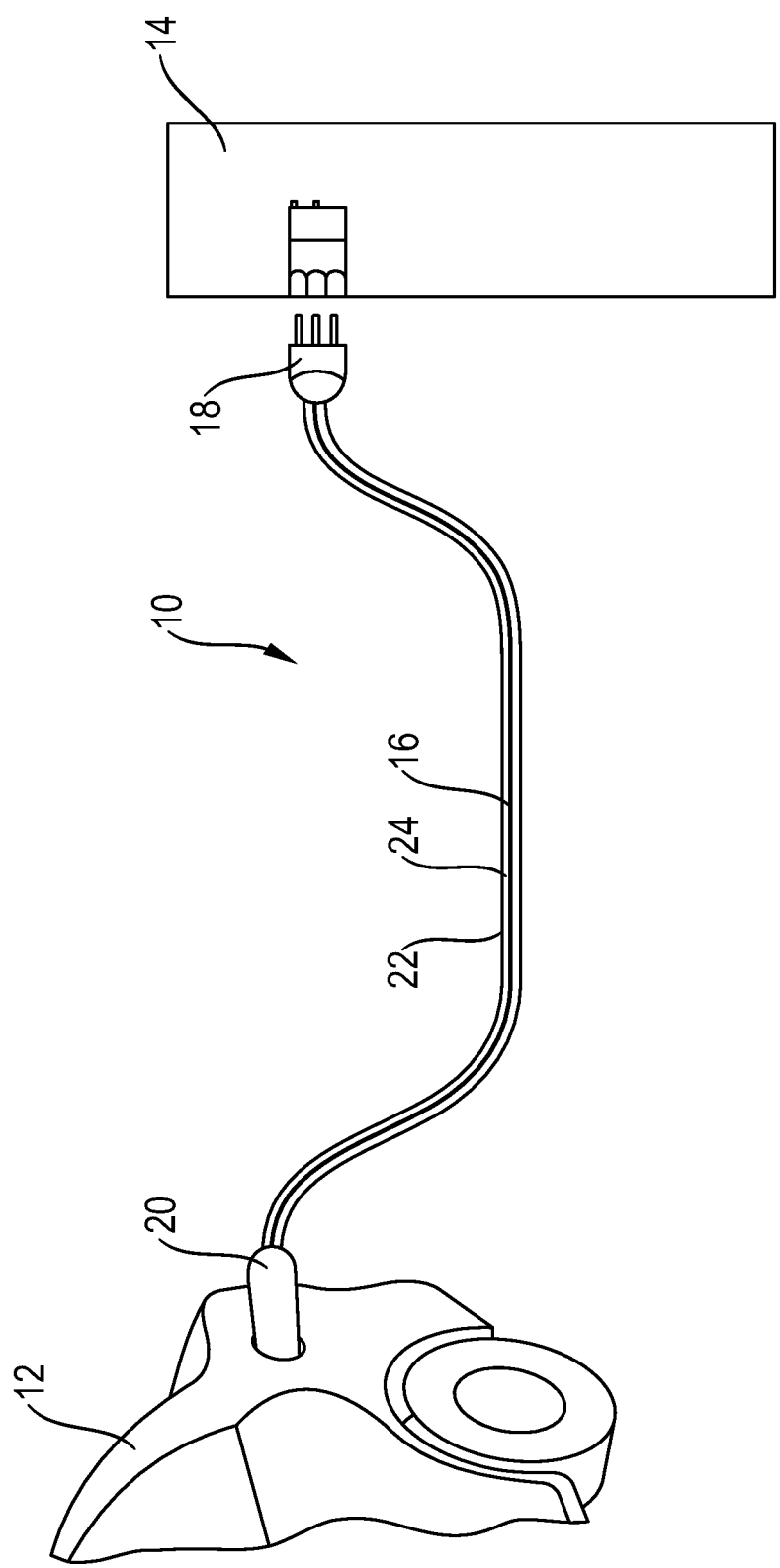
FIG. 1 shows a schematic illustration of an electric line arrangement which, as a charging cable, connects an electrically driven motor vehicle electrically to a charging station.

In FIG. 1, an electric line arrangement is illustrated schematically and is denoted generally by 10. The electric line arrangement 10 forms a charging cable for a motor vehicle 12 and connects the motor vehicle 12 to a charging station 14 in order to charge an electric energy store of the motor vehicle 12 correspondingly at the charging station 14.

The electric line arrangement 10 generally has an electrically conductive lead 16 which is connected at each of its axial ends lying opposite one another to an electric connection 18, 20 or a plug 18, 20 or plug-type connector 18, 20, in order to connect the electrically conductive lead 16 electrically to the charge station 14 or the motor vehicle 12 and correspondingly to transmit electrical energy to the electric energy store of the motor vehicle 12. The electric line arrangement 10 also has an insulation layer 22 which surrounds the electrically conductive lead 16 circumferentially and correspondingly insulates it electrically from the surroundings. The insulation layer 22 is spaced apart from the electrically conductive lead 16, with the result that a cavity is formed between the electrically conductive lead 16 and the insulation layer 22. The cavity forms a coolant duct 24 in which a cooling fluid for cooling the electrically conductive lead 16 is or can be conducted. The electrically conductive lead 16 does not have any electrically insulating cladding, with the result that the cooling fluid in the coolant duct 24 directly flows around the electrically conductive lead 16 or directly touches the current-conducting conductors of the lead 16 and correspondingly a directly convective transfer of heat is formed between the cooling fluid and the electric lead 16.

As a result of the fact that the cooling fluid is formed in the cavity between the insulation layer 22 and the electrically conductive lead 16, the technical expenditure on making available the coolant duct 24 can be considerably reduced and at the same time the discharging of the waste heat of the electrically conductive lead 16 can be considerably improved.

The electrically conductive lead 16 is connected at each of its axial ends to the respective electric connection 18, 20 or to the plug-type connector 18, 20 in order to connect the electric line arrangement 10 correspondingly to the charging station 14 and to the motor vehicle 12.

The cooling fluid, which in one preferred embodiment is formed by ambient air in a cooled or uncooled state, is preferably made available to the cooling duct 24 by the charging station 14 and can be discharged at the plug 20 through an opening or can be fed back to the charging station 14 via a second coolant duct (not illustrated here), as is explained in more detail below.

Figure 2:
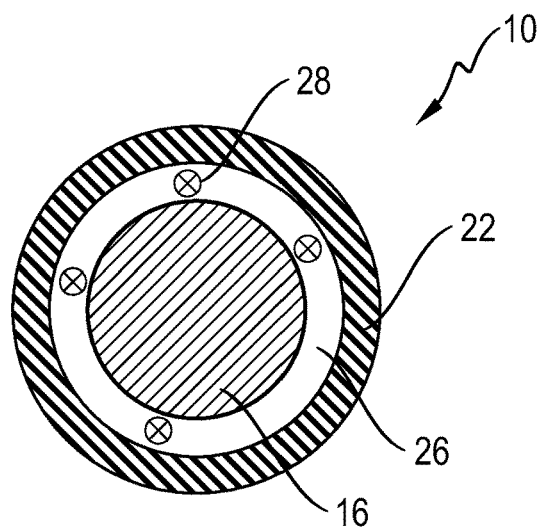
FIG. 2 shows a schematic cross-sectional view of a first embodiment of the electric line arrangement with a coolant duct.

A schematic sectional view of the electric line arrangement 10 according to a first embodiment is illustrated in FIG. 2.

The electric line arrangement 10 has the lead 16 which is formed from a multiplicity of electrically conductive conductors, preferably metal or copper conductors. The insulation layer 22 surrounds the lead 16 circumferentially and is spaced apart from the lead 16, with the result that a cavity 26 is formed in the radial direction between the lead 16 and the insulation layer 22. The cooling medium 28 which flows around the lead 16 and in this way forms a convective transfer of heat between the lead 16 and the cooling medium 28 is conducted in the cavity 26. The lead 16 is not insulated with respect to the cooling medium, with the result that the cooling medium 28 flows directly around the metallic conductors or the copper conductors. As a result, particularly good transfer of heat can be formed between the lead 16 and the cooling medium 28, with the result that effective cooling of the lead 16 is possible.

The cooling medium 28 can be formed from cooled or uncooled ambient air or can be embodied as circulating cooling fluid.

Figure 3:
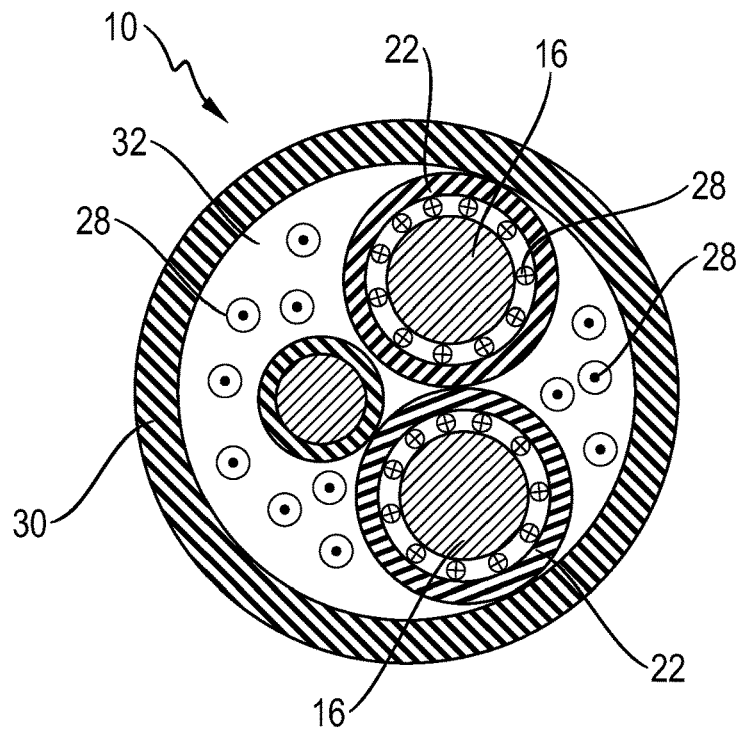
FIG. 3 shows a schematic cross-sectional view of a second embodiment of the electric line arrangement with two coolant ducts.

FIG. 3 illustrates an embodiment of the electric line arrangement 10 in a cross section. Identical elements are denoted by identical reference symbols, wherein only the particular features are explained here.

The electric line arrangement 10 has two leads 16, each with an insulation layer 22, said leads 16 being routed in parallel to one another and forming different leads or different poles of the electric line arrangement 10. The insulation layers 22 of the two leads 16 are surrounded circumferentially by a sheathed layer 30 which forms an outer sleeve of the electric line arrangement 10. The sheathed layer 30 is spaced apart from the insulation layers 22 of the leads 16, with the result that a second cavity 32 is formed between the sheathed layer 30 and the insulation layers 22.

In this arrangement, the first cavities 28 between the insulation layers 22 and the respective leads 16 form a forward flow line for the cooling medium 28, and the second cavity 32 forms a return flow line for the cooling medium 28, as illustrated in FIG. 3. The cavities 26 between the insulation layers 22 and the respective leads 16 are both connected to one of the plugs 18, 20 at an axial end, with the result that the cooling medium 28 can be pumped through the cavities 26, 32. As a result, a circulating cooling system for the leads 16 can be implemented, which cooling system can be supplied with cooling medium from one side such as, for example, the charging station 14.

Figure 4:
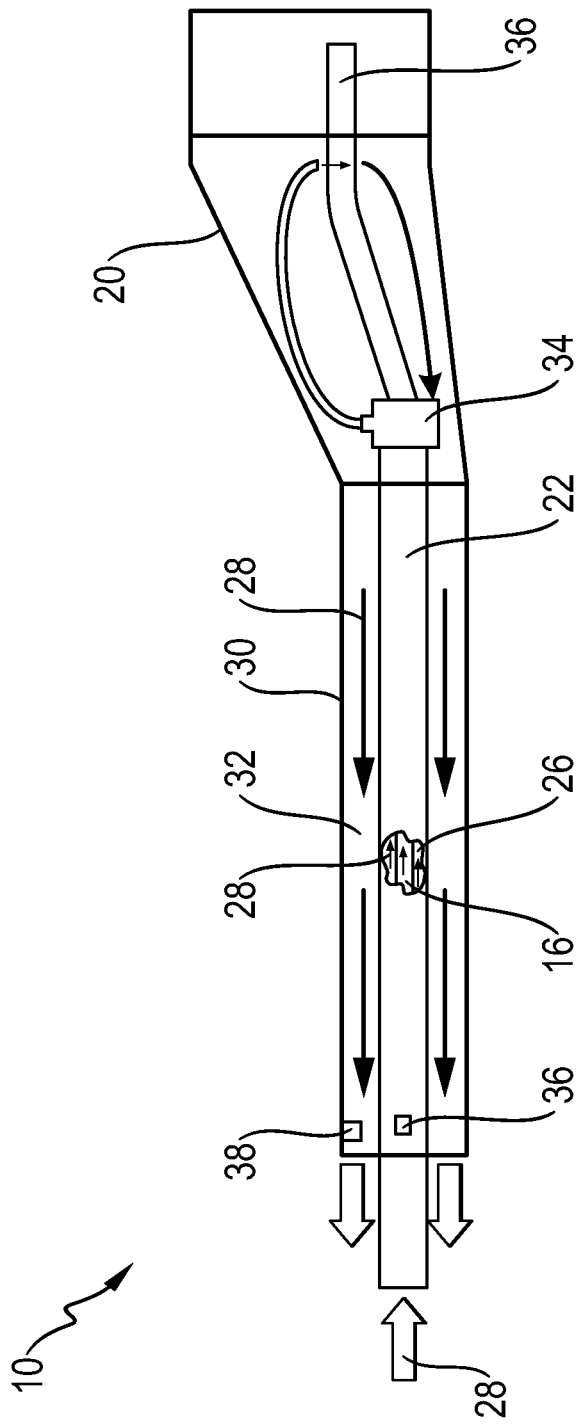
FIG. 4 shows a schematic view of a longitudinal section of the electric line arrangement according to a second embodiment from FIG. 3.

FIG. 4 illustrates a schematic sectional view of the electric line arrangement 10 in a longitudinal section. Identical elements are denoted by identical reference symbols, wherein only the particular features are explained here.

The electric line arrangement 10 has, within the sheathed layer 30, the lead 16 which is surrounded by the insulation layer 22, wherein the cooling medium 28 is conducted as a forward flow line in the cavity 26, and wherein the cooling medium 28 is conducted as a return flow line in the second cavity 32 between the sheathed layer 30 and the insulation layer 22. The electric line arrangement 10 is connected to the plug-type connector 20 in which a forward flow tap 34 is arranged, which tap is connected to the cavity 26 in order to conduct the cooling medium 28 out of the cavity 26 and introduce it into the second cavity 32 between the insulation layer 22 and the sheathed layer 30. As a result, the cavity 26 can be connected as a forward flow line to the second cavity 32 as a return flow line, and the cooling medium 28 can be correspondingly pumped around in the electric line arrangement 10. As a result, cooled cooling medium 28 can flow around the lead or leads 16, and correspondingly absorb the heat and be fed back via the second cavity 32.

In addition, an electric contact 36 for the lead 16 is formed in the plug 20, in order to connect the electric line arrangement 10 electrically to the motor vehicle 12 or the charging station 14.

In one alternative embodiment, the plug 20 can have an opening through which the cooling medium is conducted out of the cavity 26 and correspondingly disposed of. In this context, it is particularly preferred if the cooling medium 28 is formed by ambient air, with the result that the lead 16 is cooled by sucked-in ambient air, and the heated cooling air is correspondingly discharged again into the surroundings through the opening in the plug 20. As a result, cooling is possible with particularly low technical expenditure.

In one preferred embodiment, the charging station 14 has a coolant arrangement which makes available the cooling medium 28 and introduces it into the cavity 26 and, if appropriate, absorbs the fed-back cooling medium again and feeds it back again in a cooled state to the cavity 26. As a result, effective cooling of the leads 16 is possible by pumping around the cooling medium 28.

In one preferred embodiment, a pressure sensor is arranged in each case in the cavity 26 and the cavity 32, in order to measure a pressure in the cooling system, and to detect a leak in the insulation layer 22 or the sheathed layer 30. If a pressure difference is detected between the pressure sensors 36, 38, a leakage can be identified in the insulation layer 22 or the sheathed layer 30, and the location of said leakage can be determined.

What is claimed is:

1. A charging cable for a motor vehicle, comprising:
   at least one electrically conductive lead which can be placed in electrical contact at its ends in order to transmit electrical energy,
   an insulation layer which surrounds the lead circumferentially,
   a first coolant duct In which a cooling fluid for cooling the lead can be conducted,
   wherein the insulation layer is spaced apart from the lead, and the first coolant duct is formed between the insulation layer and the lead in such a way that the cooling fluid flows directly around the lead,
   a sheathed layer which surrounds the insulation layer circumferentially, wherein the sheathed layer is spaced apart from the insulation layer,
   a second coolant duct formed between the sheathed layer and the insulation layer, and
   a plug-type connector, at an axial end of the charging cable, in electrical contact with the at least one electrically conductive lead, and wherein the plug-type connector connects the first coolant duct to the second coolant duct.

2. The charging cable as claimed in claim 1, wherein a cavity, which forms the first coolant duct, is formed between the insulation layer and the lead.

3. The charging cable as claimed in claim 1, wherein the first coolant duct forms a coolant forward flow line, and the second coolant duct forms a coolant return flow line.

4. The charging cable as claimed in claim 1, wherein the plug-type connector has an opening which is connected to the first coolant duct in order to discharge the cooling fluid from the electric line arrangement.

5. The charging cable as claimed in claim 1, wherein the plug-type connector is configured to be connected to a coolant arrangement in order to feed the cooling fluid to the first coolant duct.

6. The charging cable as claimed in claim 1, wherein the electric line arrangement has a pressure sensor which is arranged in the second coolant duct in order to detect a pressure drop in the second coolant duct.

7. The charging cable as claimed in claim 6, wherein a second pressure sensor is arranged in the first coolant duct in order to determine a position of damage to the first coolant duct.

8. The charging cable of claim 1, further comprising a second plug-type connector in order to connect the electric charging cable to the motor vehicle or to a charging station.

9. The charging cable of claim 1, wherein the insulation layer is a solid tube.

10. A charging cable for a motor vehicle, comprising:
at least one electrically conductive lead which can he placed in electrical contact at its ends in order to transmit electrical energy,
an insulation layer which surrounds the lead circumferentially,
a first coolant duct in which a cooling fluid for cooling the lead, can be conducted,
wherein the insulation layer is spaced apart from the lead, and the first coolant duct is formed between the insulation layer and the lead in such a way that the cooling fluid flows directly around the lead, and
a plug-type connector, at an axial end of the charging cable, in electrical contact with the at least one electrically conductive lead,
wherein the plug-type connector is configured to be connected to a coolant arrangement in order to feed the cooling fluid to the first coolant duct.

11. A charging cable for a motor vehicle, comprising:
two electrically conductive leads, each electrically conductive lead having axial ends lying opposite one another and each axial end being connected to an electric connection in order to place the respective electrically conductive lead in electrical contact at the axial ends to a charging station and the motor vehicle and, in order to transmit electrical energy to an electric energy store of the motor vehicle,
wherein the two electrically conductive leads form different poles of the charging cable,
a first insulation layer which surrounds a first lead of the two electrically conductive leads circumferentially and is spaced apart from the first lead,
a second insulation layer which surrounds a second lead, of the two electrically conductive leads circumferentially and is spaced apart from the second lead,
a first coolant duct in which a cooling fluid for cooling the first lead of the two electrically conductive leads can be conducted, wherein the first coolant duct is formed between the first insulation layer and the first lead such that the cooling fluid flows directly around the first lead,
a second coolant duct in which a cooling fluid for cooling the second lead of the two electrically conductive leads can be conducted, wherein the second coolant duct is formed between the second insulation layer and the second lead such that the cooling fluid flows directly around the second lead, and
a circulating cooling system for the two electrically conductive leads which can be supplied with cooling medium from the charging station.

* * * * *